United States Patent
Roth

(10) Patent No.: US 8,485,535 B2
(45) Date of Patent: Jul. 16, 2013

(54) SEALING GLAND FOR RIBBON-SHAPED PROBE

(75) Inventor: Martin E. Roth, Norwalk, OH (US)

(73) Assignee: Sierra Lobo, Inc., Fremont, OH (US)

( * ) Notice: Subject to any disclaimer, the term of this patent is extended or adjusted under 35 U.S.C. 154(b) by 403 days.

(21) Appl. No.: 12/476,835

(22) Filed: Jun. 2, 2009

(65) Prior Publication Data

US 2009/0302547 A1   Dec. 10, 2009

Related U.S. Application Data

(60) Provisional application No. 61/059,286, filed on Jun. 6, 2008.

(51) Int. Cl.
*F16J 15/02* (2006.01)
(52) U.S. Cl.
USPC .......................................... 277/630; 277/632
(58) Field of Classification Search
USPC .................. 277/317–320, 630, 632, 641–643
See application file for complete search history.

(56) References Cited

U.S. PATENT DOCUMENTS

| | | | | |
|---|---|---|---|---|
| 3,744,008 A * | 7/1973 | Castellani | ........................ | 248/56 |
| 5,149,105 A * | 9/1992 | Beaver et al. | ................. | 277/312 |
| 6,431,750 B1 | 8/2002 | Haberbusch et al. | | |
| 7,043,925 B2 | 5/2006 | Haberbusch | | |
| 7,341,650 B2 * | 3/2008 | Matsuo et al. | ................. | 204/426 |
| 7,347,053 B1 | 3/2008 | Haberbusch et al. | | |
| 7,415,877 B2 * | 8/2008 | Okumura et al. | ................ | 73/431 |
| 2002/0069837 A1 * | 6/2002 | Genser | ............................ | 122/11 |
| 2005/0022361 A1 * | 2/2005 | Matsuo et al. | ................... | 29/517 |

OTHER PUBLICATIONS

Conax Technologies, Product Information Sheet No. 5001C for Split Seals for Single & Multiple Probe Sealing, downloaded from www.conaxtechnologies.com on Nov. 11, 2009.

* cited by examiner

*Primary Examiner* — Gilbert Lee
(74) *Attorney, Agent, or Firm* — Pearne & Gordon LLP

(57) ABSTRACT

A sealing gland for accommodating a ribbon-shaped element is provided to include a fitting, a bore, an alignment assembly and a cap portion. The bore extends along an axis through the fitting. The alignment assembly is configured to be mounted within the bore and includes an element slot such that the ribbon-shaped element can extend through the alignment assembly. The element slot is cuboidal in shape and is defined by a length, a height and a width. The alignment assembly is arranged so that the length is parallel with the axis. The cap portion is configured to be mounted on the fitting to retain the alignment assembly.

12 Claims, 4 Drawing Sheets

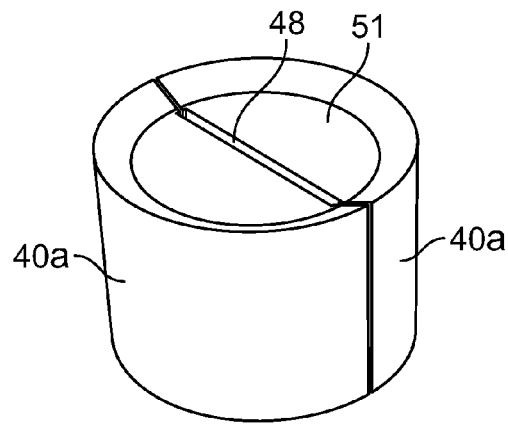
FIG. 4
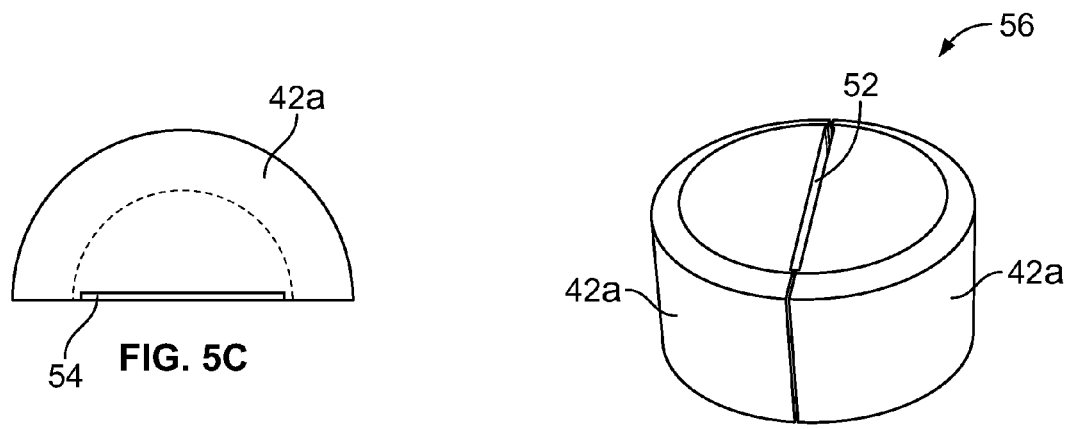
FIG. 5C
FIG. 5B
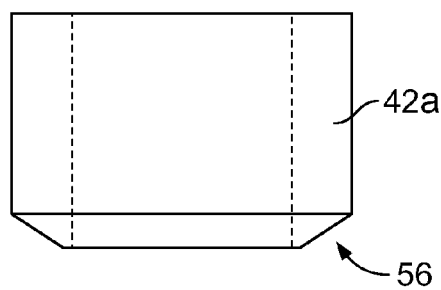
FIG. 5A
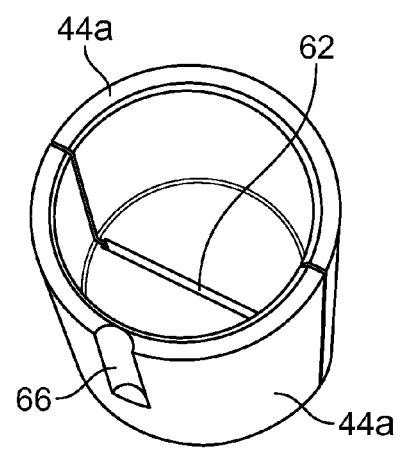
FIG. 6

SEALING GLAND FOR RIBBON-SHAPED PROBE

CROSS-REFERENCE TO RELATED APPLICATIONS

This application claims the benefit of U.S. Provisional Application No. 61/059,286, filed Jun. 6, 2008, the entire disclosure of which is incorporated herein by reference.

FIELD OF THE INVENTION

The present invention relates generally to sealing glands, and more particularly, to sealing glands for supporting a probe having a particular shape.

BACKGROUND OF THE INVENTION

In cryogenic liquid tanks, such as propellant tanks for aerospace vehicles, it is desirable to know the temperature and material state in various levels of the tank. As the density of the liquid (as well as headspace vapor) varies with temperature, this information is important in determining such values as the mass of the liquid in the tank. The conditions to which the tanks, and the corresponding probes, are subjected include cryogenic temperatures and elevated pressures and may include fluctuations in temperature, pressure and the like. It is therefore highly desirable to ensure that the juncture at which the probe enters the tank be effectively sealed and that the seal be maintained under such extreme conditions.

BRIEF SUMMARY OF THE INVENTION

A sealing gland for accommodating a ribbon-shaped element includes a fitting having a bore, an alignment assembly and a cap portion. The bore extends along an axis through the fitting. The alignment assembly is configured to be mounted within the bore and includes an element slot such that the ribbon-shaped element can extend through the alignment assembly. The element slot is cuboidal in shape and is defined by a length, a height and a width. The alignment assembly is arranged so that the length is parallel with the axis. The cap portion is configured to be mounted on the fitting to retain the alignment assembly.

BRIEF DESCRIPTION OF THE DRAWINGS

The foregoing and other aspects of the present invention will become apparent to those skilled in the art to which the present invention relates upon reading the following description with reference to the accompanying drawings, in which:

FIG. 4 is a perspective view of a seat.

FIG. 5A is a side view of a seal half.

FIG. 5B is a perspective view of the seal.

FIG. 5C is a bottom view of the seal half.

FIG. 6 is a perspective view of a follower.

DESCRIPTION OF EXAMPLES OF EMBODIMENTS

Figure 1:
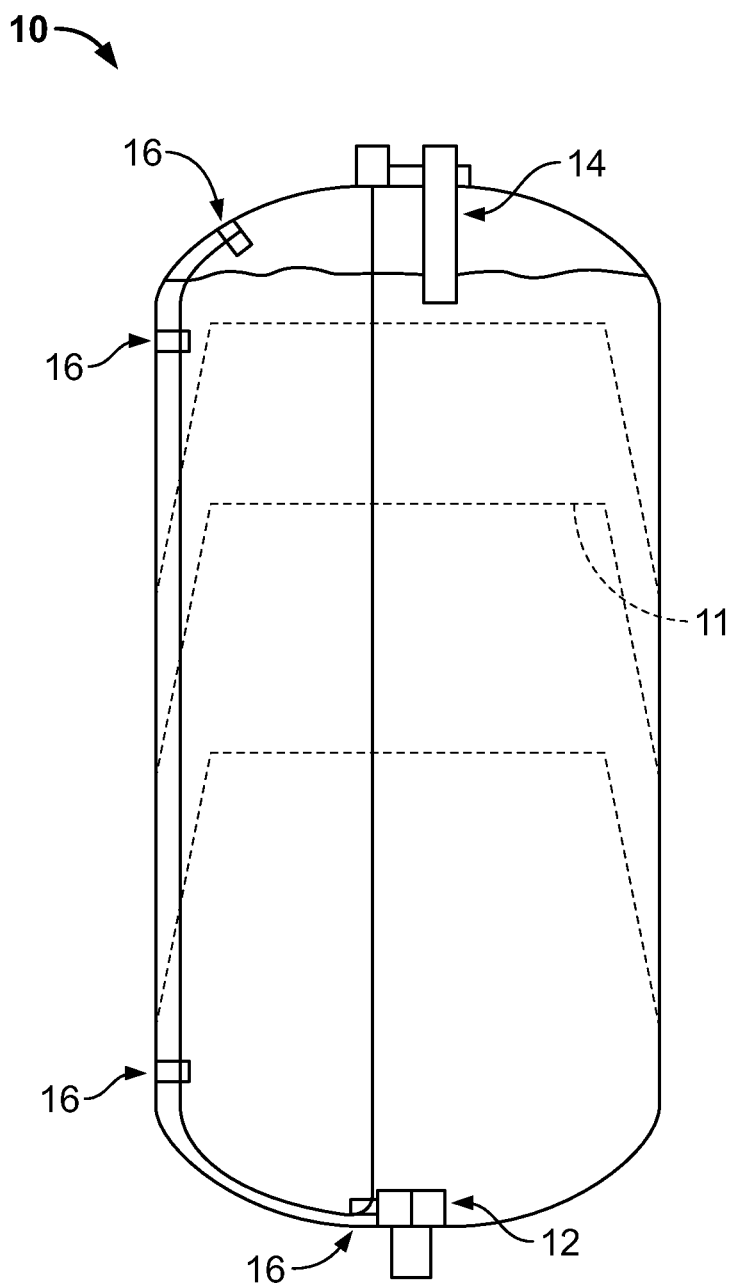
FIG. 1 is a schematic view of a sealed enclosure on which the present invention can be implemented.

Examples of embodiments that incorporate one or more aspects of the present invention are described and illustrated in the drawings. These illustrated examples are not intended to be a limitation on the present invention. For example, one or more aspects of the present invention can be utilized in other embodiments and even other types of devices.

Referring to FIG. 1, an example of a sealed enclosure 10, such as a tank, a container or the like, into which an element 18 (FIGS. 2 and 7) can be inserted and which may contain a cryogenic fluid, such as liquid hydrogen or oxygen, is shown. Heat leaking into the sealed enclosure causes the fluid to warm and stratify, as indicated by isotherms 11, due to natural buoyancy forces resulting from the temperature-induced changes in density. The present embodiment of the sealed enclosure 10 includes a drain baffle 12, a siphon tube 14 and attachment points 16 at multiple locations configured to accommodate sealing glands and allow for insertion of measurement devices, such as probes, in order to gauge various properties of the contents (e.g., temperature) inside the sealed enclosure 10.

Figure 2:
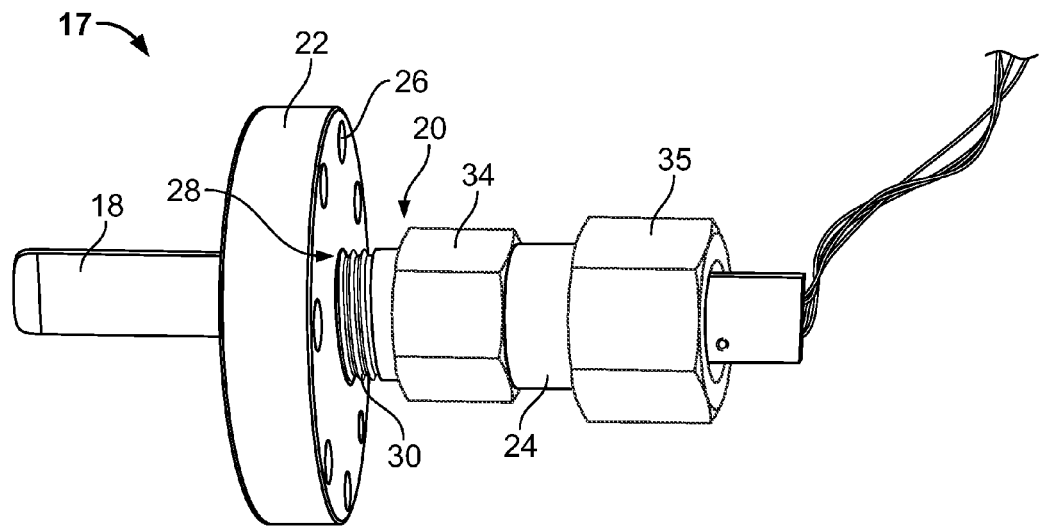
FIG. 2 is a side perspective view of an example embodiment of a sealing gland and a ribbon-shaped element.
Figure 7:
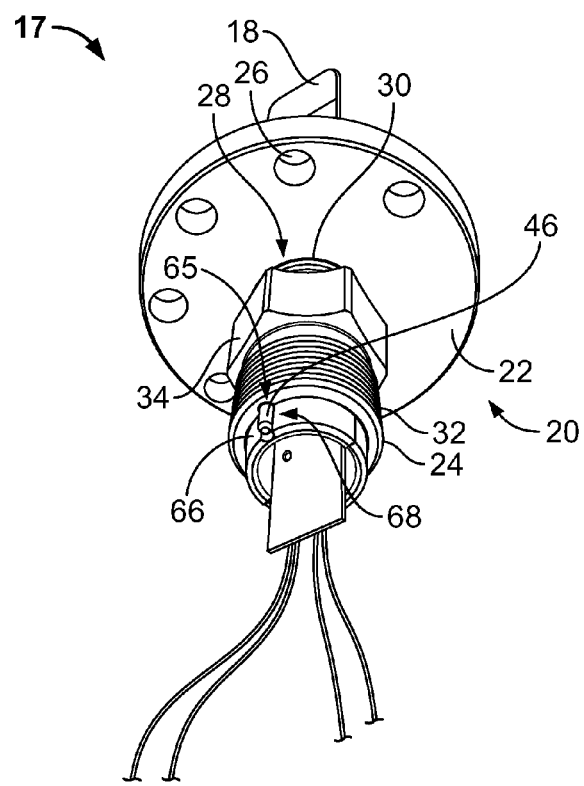
FIG. 7 is a top perspective view of the sealing gland and the element.

An example embodiment of the element 18, as shown in FIGS. 2 and 7, is a ribbon-shaped probe which can be used for measuring temperature gradients along the length of the probe and, in particular, for measuring temperatures in a tank of cryogenic liquid. Such cryogenic ribbon-like probes are more fully described in U.S. Pat. No. 6,431,750 whose disclosure is incorporated herein, in its entirety, by reference. Although the element 18 is described as a probe, it must be noted that the element 18 may perform a different function while having a similar geometry.

Referring to FIGS. 1, 2 and 7, the sealing gland 17 includes a fitting 20 having a base portion 22 and a tubular portion 24. The base portion 22 is substantially wider than the tubular portion 24 and defines a distal end of the sealing gland. The base portion 22 provides an interface with which to mount the sealing gland 17 with respect to the sealed enclosure 10 at various attachment points 16 and is configured to mate with a corresponding interface, such as a flange, provided on the sealed enclosure 10. The base portion 22 thus may include a plurality of mounting holes 26 by way of which the base portion 22 can be secured to the sealed enclosure 10 through means such as screws, nuts and bolts or the like. The base portion 22 includes a central bore 28 that is internally threaded to accommodate a distal end section 30 of the tubular portion 24 that is also threaded. The distal end section 30 of the tubular portion 24 may additionally be welded to the base portion 22 in order to prevent further rotation once the tubular portion 24 is inserted in the central bore 28 to a desired extent thereby immobilizing the tubular portion 24 about the base portion 22 and strengthening the connection between the two. The welding of the tubular portion 24 to the base portion 22 further provides a reliable seal between the tubular and base portions 24 and 22 at cryogenic temperatures in place of a conventional threaded connection. Threaded connections have a greater tendency to leak at cryogenic temperatures.

Figure 3:
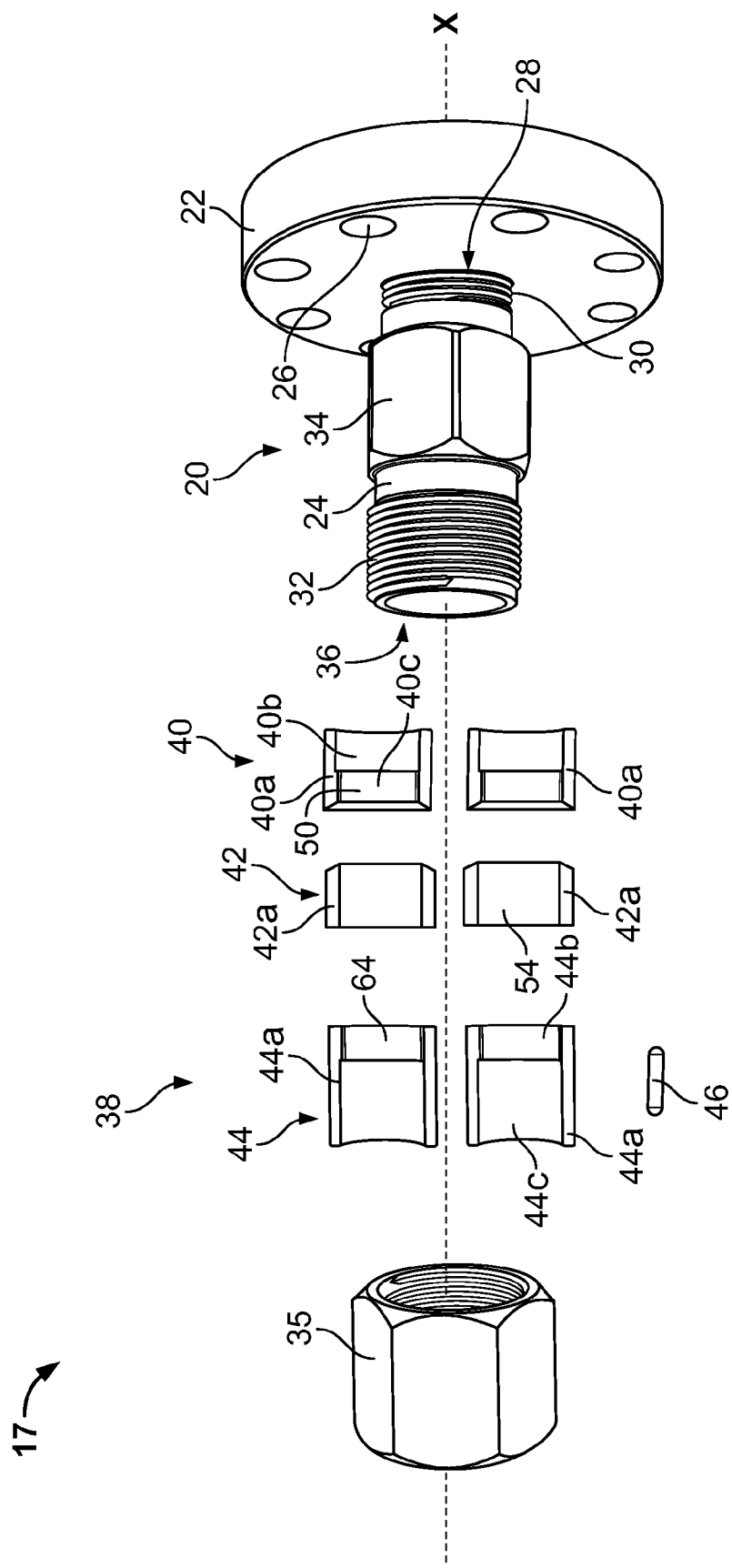
FIG. 3 is an exploded view of an alignment assembly inside the sealing gland.

The tubular portion 24 includes a proximal end section 32 that is threaded and an intermediate section 34 that is externally hexagonal, similar to a bolt head, and can be engaged by tools for rotation during assembly. The proximal end section 32 is configured to be engaged by a cap portion 35 that is internally threaded. Referring to FIGS. 2 and 3, the tubular portion 24 includes a cylindrical bore 36 that extends longitudinally through from the distal end section 30 to the proximal end section 32. The bore 36 can be divided into a distal bore section with a first internal diameter and a proximal bore section with a second internal diameter where the second internal diameter is greater than the first internal diameter. The first internal diameter of the first bore section is large enough to allow the element 18 to pass through. The proximal bore section is configured to house an alignment assembly 38 for aligning and securing the ribbon-shaped element 18 within the sealing gland 17.

Referring to FIG. 3, the alignment assembly 38 is inserted into the proximal bore section through the opening of the bore 36 on the proximal end section, and may include a seat 40, a seal 42, a follower 44 and a pin 46. The outer dimensions of the seat 40, the seal 42 and the follower 44 are such that they can be slidingly received to fit within the bore 36 with slight interference; e.g. to produce a snug fit of those elements within the bore 36.

Referring to FIGS. 3 and 4, the seat 40 is a substantially cylindrical element that is inserted first in the bore 36 and is caught by a shoulder formed at the boundary of the proximal bore section and the distal bore section. The seat 40 is formed of two symmetrical halves 40a that form a first slot 48 through which the element 18 can extend. Each seat half 40a includes a hollow section 40b on the distal end and a solid section 40c on the proximal end. The solid section 40c of each half 40a includes a recessed portion 50 that forms the first slot 48 when the seat halves 40a are combined. The first slot 48 may have a width and a height substantially equal to or slightly larger than the width and the height of the element 18, so that on compression around the element 18 when tightened, the slot-carrying elements (seat 40, seal 42 and follower 44) compress just down to the dimensions of the element 18 to form a seal therewith, and do not substantially compress the element 18 itself, which may cause damage to the element 18. A proximal end of the seat 40 has a sunken portion 51 that is shaped so as to correspond to a protruding shape of a distal end of the seal 42.

Referring to FIGS. 3 and 5A-5C, the seal 42 is also a substantially cylindrical element that is inserted into the bore 36 subsequently to the seat 40. The seal 42 is also formed of two symmetrical halves 42a that form a second slot 52 through which the element 18 can extend. Each seal half 42a is a substantially solid, semi-cylinder and includes a recessed portion 54 that forms the second slot 52 when the seal halves 42a are combined. The second slot 52 may also have a width and height substantially equal to or slightly smaller than the width and height of the element 18. As discussed above, the distal end of the seal 42, when the seal halves 42a are combined, has a chamfered end 56 that fits within the sunken portion 51 on the proximal end of the seat 40.

Referring to FIGS. 3 and 6, the follower 44 is also a substantially cylindrical element that is inserted in the bore 36 subsequent to the seal 42. The follower 44 is formed of two substantially symmetrical halves 44a that form a third slot 62 through which the element 18 can extend. Each follower half 44a includes a solid section 44b on the distal end and a hollow section 44c on the proximal end. The solid section 44b of each half 44a includes a recessed portion 64 that forms the third slot 62 when the follower halves 44a are combined. The third slot 62 may have a width and a height substantially equal to or slightly larger than the width and the height of the element 18 similarly as explained above.

Referring to FIGS. 6 and 7, the tubular portion 24 may include a first groove 65 that is internally formed in the bore 36 adjacent the area for the follower 44 and parallel to a central axis X. One of the follower halves 44a may also include a second groove 66 that is externally formed on the follower half 44a parallel to the central axis X. The first groove 65 and the second groove 66 can combine to form a receptacle 68 for inserting the pin 46 when the grooves 65, 66 are aligned by rotating the alignment assembly 38 within the bore 36 such that a predetermined orientation for the alignment assembly 38 is indicated.

The fitting 20, the seat 40 and the follower 44 may be made of any material that can withstand the operating conditions of the sealing gland 17, which also possesses the desired qualities of strength, rigidity, corrosion resistance and machineability. In the present embodiment, stainless steel is preferred for these parts. Moreover, the qualities desired for the seal 42 may be imperviousness, deformability and machineability. The seal 42 advantageously can be made of PTFE, e.g. Teflon® brand material although Viton®, Lava® or Grafoil® material as known in the art, can be alternatives. Other suitable, e.g., elastomeric, materials that can withstand cryogenic temperatures and will provide adequate sealing via compression-induced deformation within the fitting may also be used.

In order to mount the element 18 within the sealing gland 17, the ribbon-shaped element 18 is first inserted into the bore 36. Thereafter, each seat half 40a, each seal half 42a and each follower half 44a is inserted one by one, and the assembly 38 and the element 18 are rotated to align the first groove 65 and the second groove 66 for insertion of the pin 46. Once the pin 46 is inserted in the receptacle 68, the alignment assembly 38 can be retained by placing and torquing the cap portion 35 on the proximal end section 32 of the tubular portion 24. The torquing of the cap portion 35 tends to push the chamfered end 56 of the seal 42 into the sunken portion 51 of the seat 40 and to increase the diameter of the seal 42, thereby forming a fluid tight seal around the element 18. The externally hexagonal cap portion 35 is configured to press against the follower 44 as the cap portion 35 is rotated to secure the alignment assembly 38 and may increase the diameter of the seal 42 through deformation. As a result, the seal 42, which acts as the primary element in preventing passage of fluid at the sealing gland, may deform to seal the bore 36 around the ribbon-shaped element 18.

The alignment of the halves 40a, 42a, 44a aligns the recessed portions 50, 54 and 64 such that a first recess and a second recess are created on opposite sides of the element 18 thereby forming an element slot for the ribbon-shaped element 18 to extend through the sealing gland 17. It may be possible for the slots 48, 52, 62 to have the same width and height but this is not required. If the width and height in one slot are smaller than the other slots, this slot may secure or squeeze the element 18 with better grip than the rest of the slots. However, all of the slots 48, 52, 62 should be dimensioned to provide sufficient room for the element 18 so as to avoid crushing or deforming the element 18 and causing malfunction.

The shape of the element slot of the alignment assembly, which is defined by the cooperating and opposing recesses 50, 54 and 64 of the associated structures (halves 40a, 42a, 44a), can be described as cuboid or more specifically a rectangular cuboid having a length, a height and a width. The cuboid is formed such that the length is substantially parallel to the central axis X. In order to accommodate the ribbon-shaped element, the width is configured to be substantially larger than the height.

The halves 40a, 42a and 44a may be formed by dividing a cylindrical piece in half, as by cutting or sawing or slicing, and then machining each half to produce the recesses 50, 54 and 64. However, halves 40a, 42a and 44a prepared by cutting the whole in half may produce an insufficient interference fit when the respective halves are combined to form the seat 40, seal 42 and follower 44, which are then inserted into the bore 36. The loss of material due to cutting or sawing the whole in half may impermissibly reduce the radial dimension of the halves and the resulting seat, seal and follower. It therefore may be desirable that the halves 40a, 42a and 44a are either molded or individually machined to precise dimensions such that on putting the respective halves together, the resulting seat 40, seal 42 and follower 44 will have the desired diameter or circumferential dimension to produce a suitable interference fit within the bore 36. The halves 40a, 42a and 44a can be molded into the correct shape including the respective recesses 50, 54 and 64; alternatively they can be machined from larger starting pieces into the correct shape. In a further alternative, the recesses 50, 54 and 64 may be precisely machined in a half that is supplied already having the desired exterior dimensions.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A sealing gland for reversibly accommodating a ribbon-shaped element, including:
    a fitting;
    a bore extending along an axis through the fitting;
    an alignment assembly configured to be mounted within the bore and include an element slot such that the ribbon-shaped element can extend through the alignment assembly, the element slot being cuboidal in shape and being defined by a length, a height and a width, the alignment assembly being arranged so that the length is parallel with the axis;
    said alignment assembly including a seal that includes a first seal half having a first seal recess and a second seal half having a second seal recess, wherein when the first and second seal halves are assembled the first and second seal recesses are thereby aligned to at least partially define the element slot, said seal halves being thereafter separable from one another to facilitate removal of the ribbon-shaped element from said slot.

2. The sealing gland of claim 1, wherein the fitting includes a base portion and a tubular portion extending from the base portion, and the tubular portion includes an end section on which a cap portion can be mounted.

3. The sealing gland of claim 2, wherein the end section is threaded and the cap portion is internally threaded.

4. The sealing gland of claim 1, said width being substantially larger than said height.

5. The sealing gland of claim 3, wherein the height and width of at least a portion of the element slot defined by said first and second seal recesses are dimensioned to be smaller than a height and a width of the ribbon-shaped element to achieve a fluid tight seal.

6. The sealing gland of claim 1, wherein the alignment assembly includes a seat, said seal and a follower in this order along the axis, the seat including a first seat half having a first seat recess and a second seat half having a second seat recess, and the follower including a first follower half having a first follower recess and a second follower half having a second follower recess, wherein all of the aforementioned first recesses combine to form a first assembly recess and all of the aforementioned second recesses combine to form a second assembly recess, the first and second assembly recesses being aligned to define the element slot.

7. The sealing gland of claim 6, wherein the bore is cylindrical and includes a first groove internally formed therein, the follower includes a second groove that is externally formed thereabout and is configured to be aligned with the first groove to form a channel for an alignment pin.

8. The sealing gland of claim 1, wherein the sealing gland is configured to be mounted to a sealed enclosure such that the ribbon-shaped element is in communication with an interior of the sealed enclosure.

9. The sealing gland of claim 1, wherein the element is a probe.

10. The sealing gland of claim 1, the seal being made of a material that will tend to deform on compression so as to seal the bore around the ribbon-shaped element extending axially therethrough.

11. The sealing gland of claim 1, the seal being made of PTFE.

12. The sealing gland of claim 1, the seal being made of an elastomeric material.

* * * * *